United States Patent
Stahl

(10) Patent No.: US 9,686,917 B2
(45) Date of Patent: Jun. 27, 2017

(54) DEBRIS SCREEN FOR COMBINE HARVESTER GRAIN CLEANING FAN

(71) Applicant: AGCO Corporation, Hesston, KS (US)

(72) Inventor: Michael S. Stahl, Moundridge, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/871,308

(22) Filed: Sep. 30, 2015

(65) Prior Publication Data

US 2016/0157433 A1 Jun. 9, 2016

Related U.S. Application Data

(60) Provisional application No. 62/088,216, filed on Dec. 5, 2014.

(51) Int. Cl.

| | |
|---|---|
| *A01F 12/48* | (2006.01) |
| *B07B 1/50* | (2006.01) |
| *B08B 5/00* | (2006.01) |
| *A01F 12/44* | (2006.01) |

(52) U.S. Cl.
CPC .................. *A01F 12/444* (2013.01)

(58) Field of Classification Search
CPC ........ A01F 12/444; A01F 12/44; A01F 12/48; A01F 12/54; A01D 41/1252; A01D 41/02; A01D 41/1276; A01D 57/10; A01D 75/282; A01B 71/08; B07B 1/526
USPC ............................................ 460/100, 117, 97
See application file for complete search history.

(56) References Cited

U.S. PATENT DOCUMENTS

| | | | | |
|---|---|---|---|---|
| 858,696 | A * | 7/1907 | Anderson et al. ... | A01D 61/008 460/59 |
| 3,094,829 | A * | 6/1963 | Claas ................. | A01D 41/02 460/117 |
| 3,333,405 | A * | 8/1967 | Bulin ................ | A01D 45/021 460/29 |
| 3,402,720 | A * | 9/1968 | Rowland-Hill ..... | A01F 12/48 415/121.2 |
| 3,527,233 | A * | 9/1970 | Mathews ........... | A01F 12/185 460/103 |
| 3,533,413 | A | 10/1970 | Schenk | |
| 3,566,880 | A | 3/1971 | Riffe | |
| 3,603,063 | A | 9/1971 | Stroburg | |

(Continued)

OTHER PUBLICATIONS

Intellectual Property Office, International Search Report for related UK Application No. GB1423077.5, dated Jun. 8, 2015.

*Primary Examiner* — Árpád Fábián-Kovács

(57) ABSTRACT

A combine harvester including a frame, threshing apparatus, a grain cleaning system, and a feederhouse pivotally mounted to the frame on a transverse lift axis. The feederhouse includes a conveyor for conveying cut crop material from a fore opening to an aft opening. The feederhouse is configured to support a cutting header at its forward end. The grain cleaning system includes a transverse cross-flow fan having a debris screen protecting an air inlet channel. The debris screen is pivotally mounted along a first transverse edge to the frame and along a second transverse edge to the underside of the feederhouse. One of the first transverse edge and second transverse edge is slideably mounted to the frame or feederhouse respectively to permit the feederhouse to be raised and lowered around the lift axis.

4 Claims, 3 Drawing Sheets

(56) References Cited

U.S. PATENT DOCUMENTS

| | | | | |
|---|---|---|---|---|
| 3,769,988 | A | * | 11/1973 | Burenga ................ A01D 45/24 414/502 |
| 4,442,847 | A | | 4/1984 | Buck |
| 4,657,029 | A | * | 4/1987 | Helm ..................... A01F 12/16 460/106 |
| 5,769,712 | A | * | 6/1998 | Honas ................... A01F 12/442 460/114 |
| 6,036,600 | A | * | 3/2000 | Kruckman ......... A01D 41/1252 460/117 |
| 6,659,859 | B2 | * | 12/2003 | Nieschulze ............ A01D 75/00 460/117 |
| 7,690,974 | B2 | * | 4/2010 | Johnson ................ A01D 75/00 280/507 |
| 8,062,109 | B1 | * | 11/2011 | Pearson ............ A01D 41/1252 460/59 |
| 2006/0042211 | A1 | * | 3/2006 | Heinsey .................. A01F 12/16 56/10.2 J |
| 2006/0090440 | A1 | * | 5/2006 | Gullickson ............ A01D 57/10 56/13.9 |
| 2010/0048269 | A1 | * | 2/2010 | Ricketts ................. A01F 29/16 460/2 |
| 2014/0162737 | A1 | * | 6/2014 | Stan ...................... A01F 12/444 460/1 |
| 2015/0173295 | A1 | * | 6/2015 | Unrau ...................... B07B 1/12 134/6 |
| 2016/0157432 | A1 | * | 6/2016 | Claerhout ............ A01F 12/444 460/100 |

* cited by examiner ized) in the front of the cleaning system, and often behind the combine rear axle. Air is drawn tangentially into a fan housing through a wide inlet which extends across the front of the housing, and exhausted generally rearwardly into the cleaning shoe.

DEBRIS SCREEN FOR COMBINE HARVESTER GRAIN CLEANING FAN

CROSS REFERENCE TO RELATED APPLICATION

This application claims the benefit of U.S. Provisional Application No. 62/088,216, filed Dec. 5, 2014, which is hereby incorporated by reference in its entirety.

FIELD OF INVENTION

The invention relates to combine harvesters and particularly to debris screens for protecting against the ingress of plant material through the air intake of a cross-flow fan in a grain cleaning system.

BACKGROUND

Combine harvesters have been used for decades to cut and thresh crops such as wheat and corn. Mostly self-propelled these days, the typical combine comprises a frame supporting threshing/separating apparatus, a cleaning system (or shoe), an on-board tank for storing the collected grain, and an unloading system. A feederhouse is pivotally mounted to the front of the frame for supporting a cutting header and conveying crop material from the header to the threshing apparatus, generally by means of an enclosed chain and slat elevator. The general operation of combine harvesters is well known and will not be repeated here in detail.

The cleaning system normally includes a fan for generating a cleaning airstream which is directed through the falling grain to blow lighter chaff and the like out of the rear of the shoe. One common type of fan employed is a cross-flow fan which is arranged transversely (width-wise) in the front of the cleaning system, and often behind the combine rear axle. Air is drawn tangentially into a fan housing through a wide inlet which extends across the front of the housing, and exhausted generally rearwardly into the cleaning shoe.

To prevent plant material and the like from entering the cleaning airstream it is known to provide a debris screen across the flow path upstream of the fan air inlet. Due to the close proximity of the screen to the ground, the screen is prone to blocking as material, such as leaves, is held by the pressure differential on the surface of the screen. This problem is compounded by the trend for combines having larger and thus larger cleaning fans demanding higher airflows through the inlet. Once plugged, the combine must be stopped resulting in undesirable downtime and lost harvesting time.

SUMMARY OF THE INVENTION

It is an object of the invention to provide a combine harvester having an improved debris screen for a cleaning fan inlet which is less prone to plugging.

In accordance with the invention there is provided a combine harvester comprising a frame, threshing apparatus, a grain cleaning system, and a feederhouse pivotally mounted to the frame on a transverse lift axis, the feederhouse comprising a conveyor for conveying cut crop material from a fore opening to an aft opening, the feederhouse being configured to support a cutting header at its forward end, the grain cleaning system comprising a transverse cross-flow fan having a debris screen protecting an air inlet channel, the debris screen being pivotally mounted along a first transverse edge to the frame and along a second transverse edge to the underside of the feederhouse, wherein one of the first transverse edge and second transverse edge is slideably mounted to the frame or feederhouse respectively to permit the feederhouse to be raised and lowered around the lift axis.

By mounting the debris guard between the frame and the feederhouse several advantageous effects are delivered. Firstly, the screen is located further away from the fan than in known arrangements. Therefore, the sectional area of the air inlet channel, and thus the screen, is larger resulting in a lower pressure differential and reduced risk of material being held on the screen.

Secondly, the screen moves in relation to the frame as the feederhouse is raised and lowered during operation. This movement alone assists in dislodging any plant material held against the screen.

In a preferred embodiment the combine comprises a brush which is mounted in a fixed positional relationship to the frame or feederhouse so as to slide across the debris screen as the feederhouse is raised or lowered.

The fan is preferably located behind a front axle of the frame. In a preferred embodiment the debris screen is mounted to the front axle.

The debris screen is preferably slideably mounted to the underside of the feederhouse by rollers that slide along a track fixed to the underside of the feederhouse.

The debris screen may be substantially rectangular and extends across the width of the air inlet channel.

BRIEF DESCRIPTION OF DRAWINGS

Further advantages of the invention will become apparent from reading the following description of a specific embodiment with reference to the appended drawings in which.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. References hereinafter made to certain directions, such as, for example, "front", "rear", "left" and "right", are made as viewed from the side of the combine.

Figure 1:
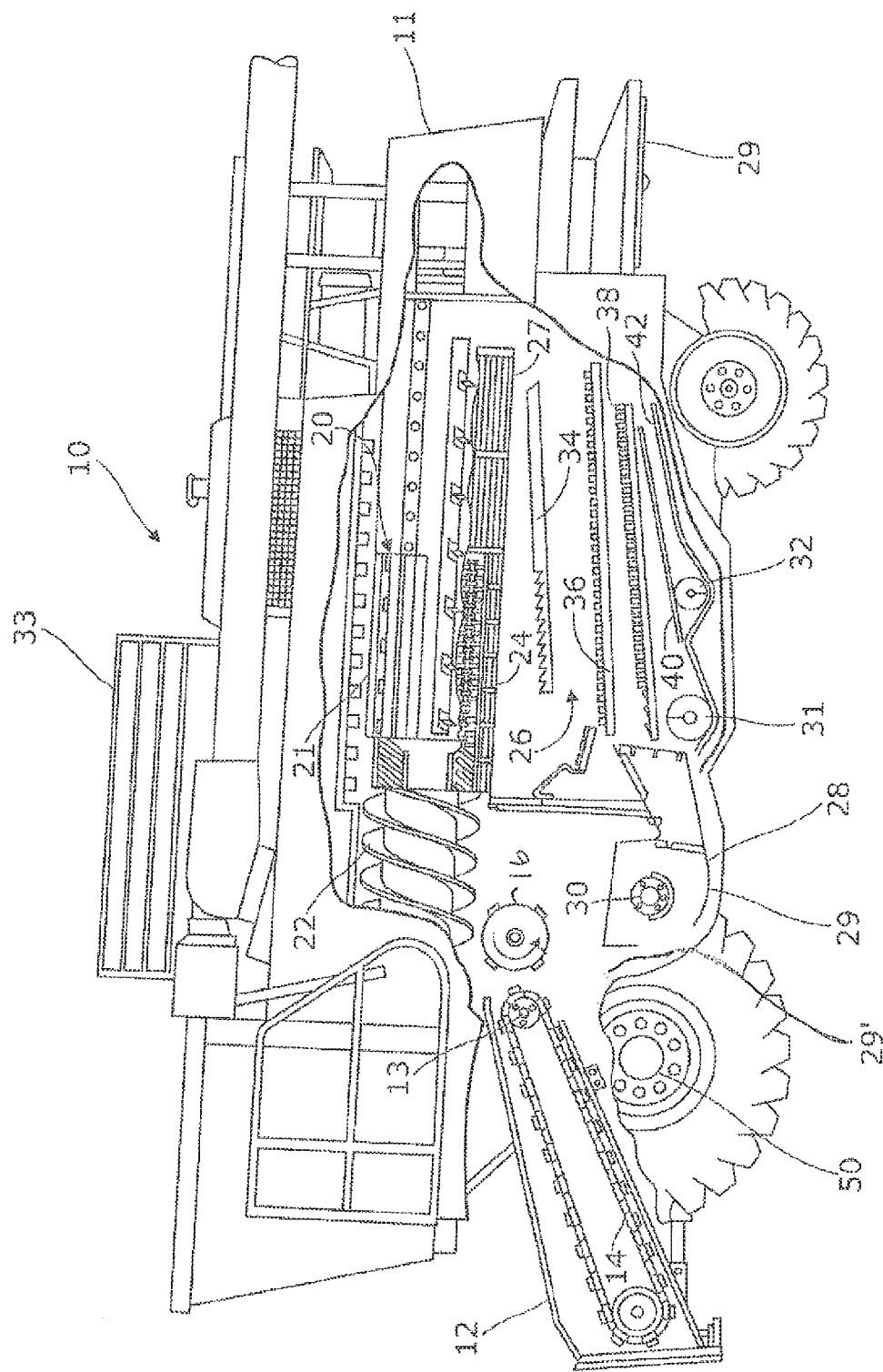
FIG. 1 is a perspective view, partially broken away, of a combine harvester in which the present invention is useful.

FIG. 1 schematically illustrates one type of combine harvester 10 to which the present invention relates. Although the harvester 10 chosen for purposes of illustration is a so-called axial rotary combine in which the threshing mechanism comprises a rotor disposed axially of the machine with respect to its fore-and-aft axis, many other types of threshing and separating mechanisms are currently in commercial use and it is not intended that the principles of the present invention be limited to any one particular type of threshing and separating mechanism.

In relevant part, harvester 10 has a frame 11 and a feederhouse 12 that receives harvested materials from a suitable header (not shown) and advances such materials upwardly and rearwardly via a conveyor 14 toward a beater 16 rotating in a counterclockwise direction viewing FIG. 1. Feederhouse 12 is pivotally mounted to the frame 11 about a transverse lift axis 13 which is coaxial with an elevator driveshaft.

Beater 16 impels the harvested materials upwardly and rearwardly into a receiving housing 18. Housing 18 contains the front end of a threshing mechanism, broadly denoted by the numeral 20. In the illustrated embodiment, the threshing mechanism 20 comprises a rotor 21 with a front end having a series of helical vanes 22 that start the materials moving rearwardly in a spiral path of travel along the outside of the rotor 21. As the materials move rearwardly, concaves 24 cooperate with rotor 21 to thresh the materials, and initial separation occurs as grain and smaller residue are pushed through the grated concaves region by centrifugal force to the cleaning apparatus 26. Large residue pieces such as stalks and stems continue to move rearwardly past a separating grate 27 which allows grain to pass radially out of the rotor area to cleaning apparatus 26, but not the larger residue. Such residue eventually discharges out the rear end of the rotor assembly where it is acted upon by a chopper or spreader (now shown) and deposited on the ground. One skilled in the art will understand that other threshing and separating mechanisms 20, such as a cylinder and concaves, may be used without departing from the scope of the invention.

Generally speaking, the threshed grain works its way downwardly through the machine as it is acted upon by the cleaning apparatus 26 which includes a fan 28.

The fan 28 is a cross-flow fan and has a fan housing 29 which contains a rotatable impeller 30 configured to rotate on a transverse axis and generate a high-velocity stream of air. The housing comprises a front opening forming an air inlet 29' through which air is drawn. Air is driven generally tangentially from the inlet 29' to a rear outlet which is in communication with the cleaning system 26.

The light chaff particles become airborne by the rearwardly directed airstream generated by the fan 28 and are discharged out the rear of the machine. Clean grain ultimately finds its way to a discharge auger 31 leading to an elevator that conveys the clean grain up to a storage tank 33 at the top of the machine. Tailings, consisting of some grain along with other particles of residue, find their way to a tailings return auger 32 which then elevates the tailings via means not illustrated for recirculation back through the threshing, separating and cleaning areas to further separate grain from such residue.

The combine harvester 10 includes as part of its cleaning apparatus 26 an upper oscillating pan 34 that delivers materials received from concaves 24 and grate 27 generally downwardly and forwardly. Those materials from pan 34 land on an upper oscillating upper chaffer 36. The upper chaffer 36 allows grain to pass downwardly through openings in the upper chaffer 36 while larger particles are impelled generally upwardly and rearwardly until being discharged off the rear end of the upper chaffer 36 and out the back of the combine harvester 10 to the ground. A finer oscillating lower sieve 38 receives the grain and residue that has passed through the upper chaffer 36 and performs essentially the same type of classifying function as upper chaffer 36. The smaller kernels of grain fall through the lower sieve 38 and onto an oscillating grain pan 40, which delivers the grain into the clean grain auger 30. The larger tailings particles unable to penetrate lower sieve 38 travel off the rear discharge end of lower sieve 38 and drop to a tailings return pan 42 that feeds such materials to the tailings return auger 32. As the kernels of grain gravitate through upper and lower sieves 36 and 38, the airstream from fan 28 entrains the light non-grain particles and carries them out the rear of the machine.

Hydraulic lift cylinders 44 are provided in a known manner between the frame 11 and the feederhouse 12 to raise and lower the feederhouse 12 (and attached header) as required.

Turning attention to the fan 28, air is drawn into the inlet 29' through an air inlet channel in the vicinity of the front axle 50. It should be understood that part of the frame 11 in FIG. 1 is shown as cut away in the vicinity of the front axle 50. However, the side walls 11' of the frame 11 forward of the fan 28 serve to define the side limits of an air inlet passage. The underside of the passage is bounded by a metal grate disposed between front axle 50 and inlet opening 29' whereas the top side is provided by the bottom housing of beater 16.

Figure 2:
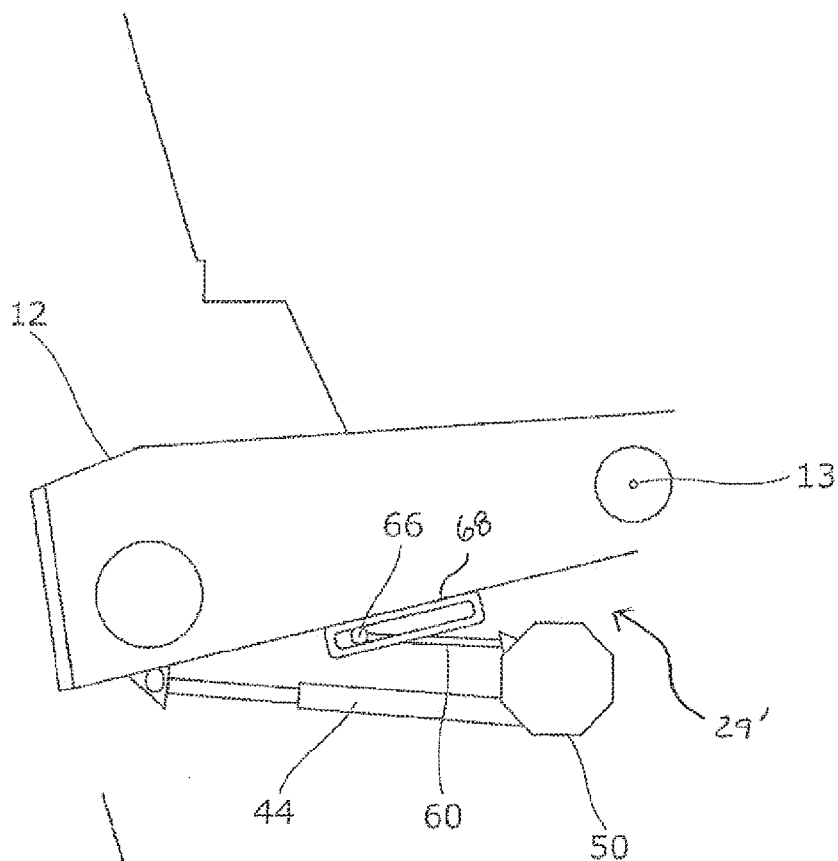
FIG. 2 is a highly schematic side view of the feederhouse and front axle region of a combine harvester embodying the invention and showing the feederhouse in a lowered position.
Figure 3:
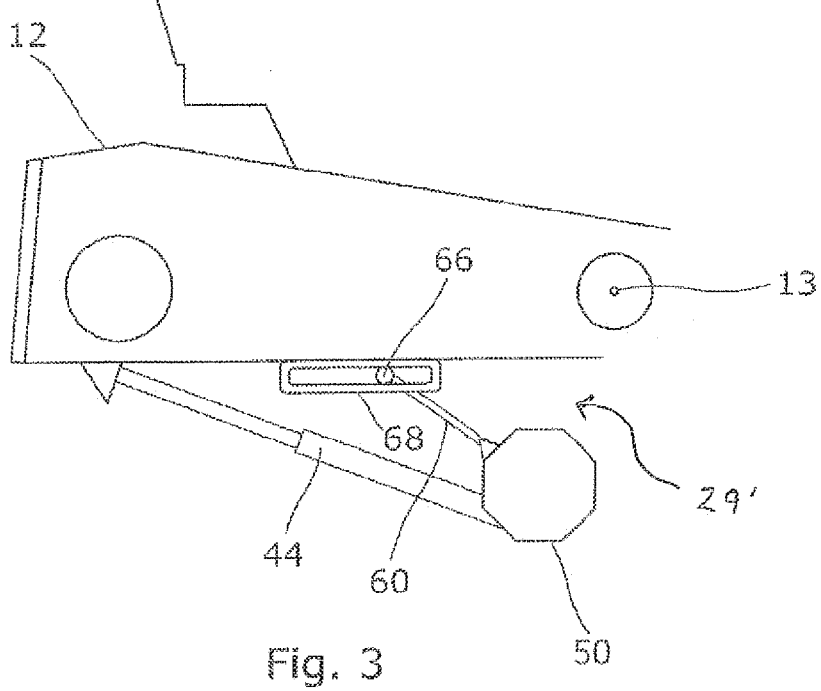
FIG. 3 is a highly schematic side view of the feederhouse and front axle region shown in FIG. 4 but with the feederhouse shown in a raised position; and, FIG. 4 is a perspective view of the underside of the feederhouse and front axle showing a debris screen in accordance with an embodiment of the invention.
Figure 4:
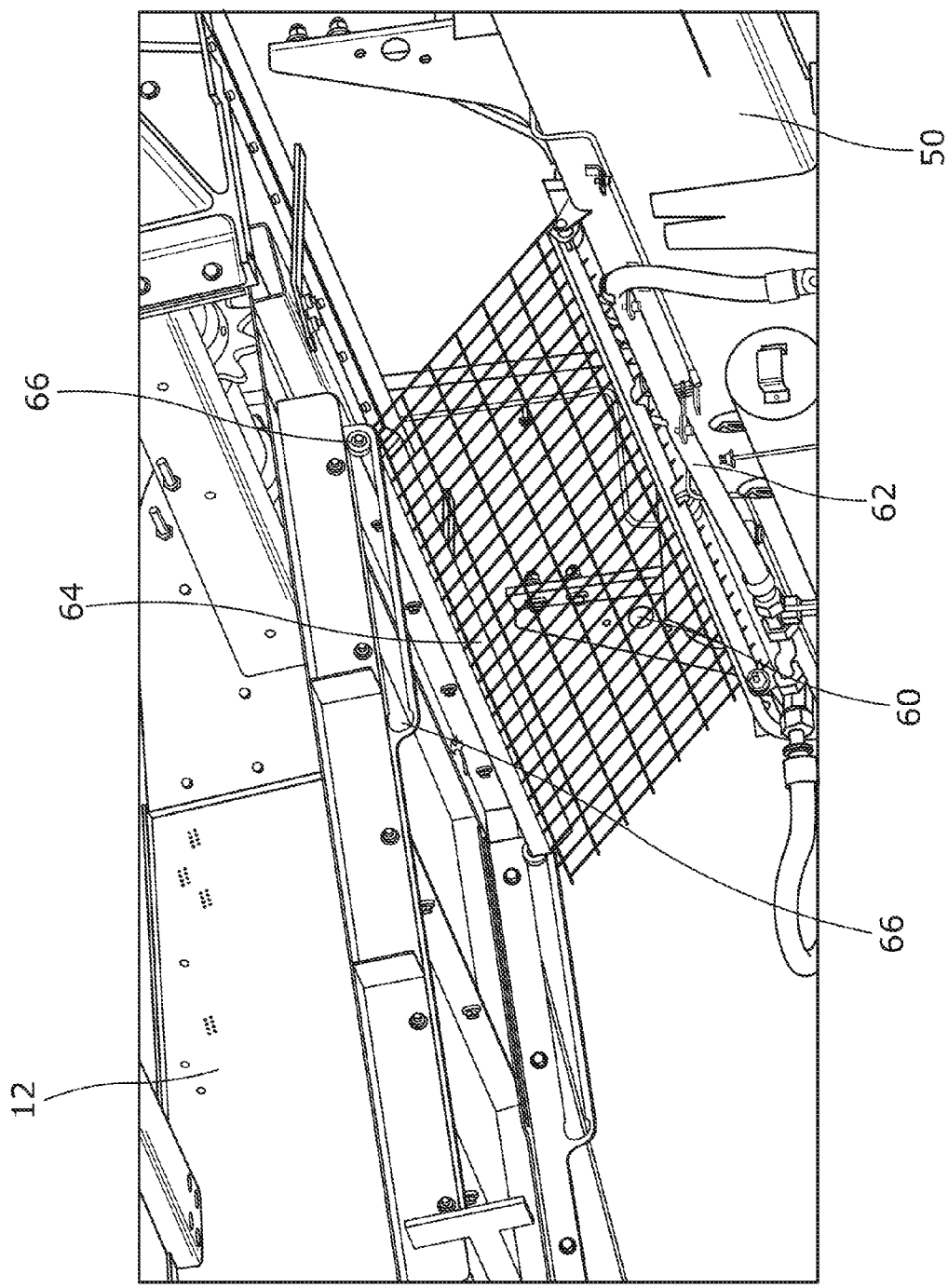

Turning to FIGS. 2, 3 and 4, in accordance with the invention a debris screen 60 is pivotally mounted along a first transverse edge 62 to the frame and along a second transverse edge 64 to the underside of the feederhouse 12. The second transverse edge 64 is slideably mounted to the feederhouse 12 to permit the feederhouse 12 to be raised and lowered. The slideable mounting includes a pair of rollers 66 rotationally mounted to the screen 60 and a pair of transversely-spaced rails 68 aligned fore and aft and fixed to the underside of the feederhouse 12. Each roller 66 slideably engages a respective rail 68 and maintains the second, upper, edge 64 proximate to the underside of feederhouse 12 as such is raised and lowered.

In the illustrated embodiment screen 60 is rectangular with a rectangular lattice of bars forming the screen. However, it should be understood that other designs of screen may be employed without departing from the scope of the invention.

The screen 60 mounted in accordance with an embodiment of the invention may form a portion of a larger screen assembly wherein another screen is fixed in relation to the frame.

FIG. 2 shows the feederhouse 12 in a lowered position (corresponding to a cutting mode). Here it can be seen that the rollers 66 are disposed towards the forward-most travel limit within rails 68.

FIG. 3 shows the feederhouse 12 in a raised position (corresponding to a non-cutting, or headland, mode) in which the screen 60 is more upright and the rollers 66 are disposed toward the rear limit of travel in the rails 68.

In a not illustrated embodiment, a brush or other agitator may be provided against the external surface of the screen so that the brush serves to dislodge leaves and the like as the feederhouse 12 is raised and lowered.

Although described above as being slideable mounted to the feederhouse, the screen may instead be slideably mounted to the frame to permit the feederhouse to be raised and lowered. In this case, rails, or other such mechanism, may be fixed to the front axle.

It should be emphasized that the above-described embodiment of the present disclosure is merely a possible example of implementation, merely set forth for a clear understanding of the principles of the disclosure. Many variations and modifications may be made to the above-described embodiment of the disclosure without departing substantially from the spirit and principles of the disclosure.

The invention claimed is:

1. A combine harvester comprising:
   a frame;
   threshing apparatus;
   a grain cleaning system; and,
   a feederhouse pivotally mounted to the frame on a transverse lift axis so as to move between a lowered position and a raised position;
   the feederhouse comprising a conveyor for conveying cut crop material from a fore opening to an aft opening;
   the feederhouse being configured to support a cutting header at its forward end;
   the grain cleaning system comprising a transverse cross-flow fan having a debris screen protecting an air inlet;
   the debris screen being pivotally mounted along a first transverse edge to the frame, and wherein the debris screen is pivotally and slideably mounted along a second transverse edge to the underside of the feederhouse with rollers that slide along a track fixed to the underside of the feederhouse to permit the feederhouse to be raised and lowered around the lift axis between the lowered position and the raised position.

2. A combine harvester according to claim 1, wherein the frame comprises a front axle, and wherein the fan is located behind the front axle.

3. A combine harvester according to claim 2, wherein the frame comprises a front axle, and wherein said first transverse edge of the debris screen is mounted proximate the front axle.

4. A combine harvester according to claim 1, wherein the debris screen is substantially rectangular and extends across the width of the air inlet.

\* \* \* \* \*